United States Patent
Inagaki et al.

(10) Patent No.: US 11,434,359 B2
(45) Date of Patent: Sep. 6, 2022

(54) RESIN COMPOSITION, RESIN CURED PRODUCT AND RESIN SUBSTRATE

(71) Applicant: TDK CORPORATION, Tokyo (JP)

(72) Inventors: Takashi Inagaki, Tokyo (JP); Junpei Hayama, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/978,260

(22) PCT Filed: Mar. 4, 2019

(86) PCT No.: PCT/JP2019/008326
§ 371 (c)(1),
(2) Date: Nov. 25, 2020

(87) PCT Pub. No.: WO2019/172169
PCT Pub. Date: Sep. 12, 2019

(65) Prior Publication Data
US 2021/0070978 A1    Mar. 11, 2021

(30) Foreign Application Priority Data

Mar. 8, 2018   (JP) .............................. JP2018-041990

(51) Int. Cl.
| | | |
|---|---|---|
| *C08L 33/14* | (2006.01) | |
| *B32B 27/08* | (2006.01) | |
| *B32B 27/18* | (2006.01) | |
| *B32B 27/38* | (2006.01) | |

(52) U.S. Cl.
CPC ............. *C08L 33/14* (2013.01); *B32B 27/08* (2013.01); *B32B 27/18* (2013.01); *B32B 27/38* (2013.01); *B32B 2250/24* (2013.01); *B32B 2270/00* (2013.01); *B32B 2307/3065* (2013.01)

(58) Field of Classification Search
CPC ........ C08L 33/14; C08L 43/02; C08L 101/02; B32B 27/08; B32B 27/18; B32B 27/38; B32B 2250/24; B32B 2270/00; B32B 2307/3065; C08K 3/00
See application file for complete search history.

(56) References Cited

U.S. PATENT DOCUMENTS

2008/0242795 A1* 10/2008 Jang ...................... C08F 220/18
                                                    524/547
2014/0346418 A1* 11/2014 Jang ...................... C08F 220/18
                                                    252/602
2017/0158807 A1*  6/2017 Yoshimoto ........... H05K 1/0373

FOREIGN PATENT DOCUMENTS

| CN | 104011096 A |   | 8/2014  |
|----|-------------|---|---------|
| CN | 106471035 A |   | 3/2017  |
| JP | 2006-342217 A |   | 12/2006 |
| JP | 2007091824 A | * | 4/2007  |
| JP | 2012-131992 A |   | 7/2012  |
| JP | 2018-172458 A |   | 11/2018 |

OTHER PUBLICATIONS

Machine Translation of JP 2007091824, https://patentscope.wipo.int/search/en/detail.jsf?docId=JP270991725&tab=FULLTEXT&_cid=P10-KTBM2L-23039-1 (Year: 2007).*
Min-Da Shau et al., "Syntheses, Structure, Reactivity, and Thermal Properties of New Cyclic Phosphine Oxide Epoxy Resins Cured by Diamines" Journal of Polymer. Science Part A: Polymer Chemistry, vol. 34, No. 3, pp. 387-396, 1996.
Apr. 9, 2019 International Search Report issued in International Patent Application No. PCT/JP2019/008326.

* cited by examiner

*Primary Examiner* — Callie E Shosho
*Assistant Examiner* — Bethany M Miller
(74) *Attorney, Agent, or Firm* — Oliff PLC

(57) ABSTRACT

A resin composition including: a thermosetting resin component including a mesogen; and a phosphorus atom-containing thermoplastic polymer type frame retardant, wherein the thermoplastic polymer type frame retardant is a phosphorous atom-containing formed by polymerizing or copolymerizing one of monomers represented by general formulae (1) and (2) below,

[Formula 1]

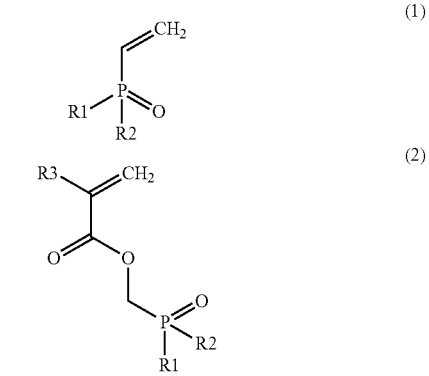

wherein, in the general formulae (1) and (2), each of R1 and R2 is any one of an alkyl group, an alkoxy group, an aryl group and an aryloxy group, R1 and R2 being different or identical, and R3 is a methyl group or a hydrogen atom.

10 Claims, 3 Drawing Sheets

RESIN COMPOSITION, RESIN CURED PRODUCT AND RESIN SUBSTRATE

TECHNICAL FIELD

This invention relates to a resin composition including an epoxy resin; and a resin sheet, a resin cured product and a resin substrate using the resin composition.

This application claims priority based on Japanese Patent Application No. 2018-041990, filed in Japan on Mar. 8, 2018, and is hereby incorporated herein by reference.

BACKGROUND ART

In recent years, with the miniaturization of electronic devices, components are becoming more sophisticated and densely packed, and the amount of heat generated from these components is increasing.

The heat generated from electronic components is mainly dissipated to the outside through the substrate. In the case of a laminated substrate for a power supply, since the thermal conductivity of the laminated substrate for a power supply is lower than that of a metal substrate, thermal conductive fillers such as aluminum oxide, boron nitride, magnesium oxide, and the like are added to the resin to increase the thermal conductivity.

However, if the thermal conductive filler content in the resin composition is increased in order to improve the thermal conductivity, the fluidity of the coating material at the time of molding the resin substrate will cause problems. Therefore, efforts have been made to develop a resin capable of producing a high thermal conductivity in order for a resin substrate having high heat dissipation to be obtained even if the fluidity of the coating material is retained by suppressing the content of the thermal conductive filler in the resin composition.

As a method for increasing the thermal conductivity of the cured resin product, there is a method of using a highly oriented liquid crystal epoxy resin in which a rigid and rod-shaped skeleton called mesogen is introduced into the resin (for example, Patent Literature 1).

On the other hand, when an epoxy resin composition with high thermal conductivity as described above is used as a substrate or the like, not only thermal conductivity but also flame retardance is important. A common method of imparting flame retardance to a resin is to add a compound containing phosphorus or bromine. In recent years, since it is desirable to be halogen-free from an environmental standpoint, the use of phosphorus-based flame retardants has been promoted.

Phosphorus-based flame retardants can be broadly classified into two types: those that react with thermosetting resins and those that do not react. Compounds such as those shown in Patent Literature 2 are known for the reactive type. In addition, phosphate esters and phosphine oxides are used as non-reactive compounds (Non-Patent Literature 1).

PRIOR ART LITERATURE

Patent Literature

Patent Literature 1: Japanese Unexamined Patent Application, First Publication No. 2012-131992 (A)
Patent Literature 2: Japanese Unexamined Patent Application, First Publication No. 2006-342217 (A)

Non-Patent Literature

Non-Patent Literature 1: J. Polym. Sci. Part A: Polym. Chem., 34, 387 (1996)

SUMMARY OF INVENTION

Technical Problem

When a phosphorus-based flame retardant is used to develop flame retardancy, the phosphorus atoms contained in the resin need to be about 1 to 3 wt % based on the weight of the resin. When the reactive flame retardant described in Patent Literature 2 is used for a highly oriented liquid crystal epoxy resin, adding an amount capable of exhibiting flame retardancy destroys the oriented structure and causes a significant decrease in thermal conductivity. On the other hand, the non-reactive flame retardant described in Non-Patent Literature 1 diffuses in the resin and causes bleed-out, and the flame retardancy is lost in the end.

For the reasons explained above, there is a trade-off between the thermal conductivity and the flame retardancy of the resin in the flame retardants that are commonly used. To eliminate this trade-off, a flame retardant that does not inhibit the fonnation of the oriented structure of the resin is required. Furthermore, in order to maintain flame retardancy for a long period of time, it is also required that the flame retardant does not bleed-out.

The present invention has been made in view of the above problems, and an object of the present invention is to provide a resin composition, a resin sheet, a cured resin product, and a resin substrate which are highly oriented and have both high thermal conductivity and flame retardancy.

Solution to Problem

In order to solve the above problems, the present inventors have made extensive studies. As a result, they have found that a resin composition that can solve all the problems of thermal conductivity, flame retardancy, and bleed-out by combining a thermosetting resin component containing mesogen and a thermoplastic polymer type flame retardant containing a phosphorus atom. The present invention includes the following aspects.

[1]: A resin composition including: a thermosetting resin component including a mesogn; a thermally conductive filler having a thermal conductivity of 30 W/(m-K) or more; and a phosphorus atom-containing polymer compound formed by polymerizing or copolymerizing one of monomers represented by general formulae (1) and (2) below,

[Formula 1]

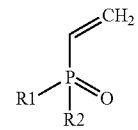

(1)

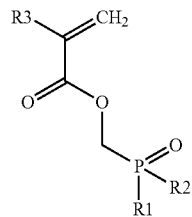

(2)

wherein, in the general formulae (1) and (2), each of R1 and R2 is any one of an alkyl group, an alkoxy group, an aryl group and an aryloxy group, R1 and R2 being different or identical, and R3 is a methyl group or a hydrogen atom.

[2]: The resin composition according to [1], wherein the thermosetting resin component is an epoxy resin.

[3]: The resin composition according to [1] or [2], wherein the mesogen is a biphenyl group.

[4]: A resin cured material obtained by curing the resin composition according to any one of [1] to [3].

[5]: A resin sheet comprising the resin composition according to any one of [1] to [3].

[6]: A resin substrate obtained by molding and curing a single sheet or a plurality of laminated sheets of the resin sheet according to [5].

[7]: The resin cured product according to [4], wherein a diffraction angle in XRD measurement using a CuKα ray has a peak in a range of $2\theta \leq 30°$.

Advantageous Effects of Invention

According to the resin composition of the aspect of the present invention, it is possible to satisfy both a high thermal conductivity due to high orientation and a high flame retardancy due to phosphorus.

DESCRIPTIONS OF EMBODIMENTS

Figure 1:
FIG. 1 is a cross-sectional view showing the structure of a resin sheet using the resin composition of the embodiment of the present invention.

Hereinafter, embodiments of the present invention will be described in detail with reference to the drawings as appropriate. The drawings used in the following description may be enlarged for convenience in order to make the features of the embodiment of the present invention easy to understand. Therefore, the dimensional ratio of each component described in the drawings may differ from the actual one. The materials, dimensions, etc. exemplified in the following description are examples, and the present invention is not limited thereto, and can be changed to various embodiments without departing from the gist thereof.

(1. Resin Composition)

First, the resin composition of one embodiment of the present invention will be described.

The resin composition is used for producing a resin sheet, a cured resin product, a resin substrate, and the like, which will be described later. However, the resin composition may be used for other purposes.

(1-1. Configuration)

This resin composition contains: a compound (hereinafter, polymer-type flame retardant) obtained by polymerizing or copolymerizing a monomer represented by the following formula (1) or (2) as a flame retardant; and a thermosetting resin component containing a mesogen.

[Formula 2]

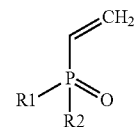
(1)

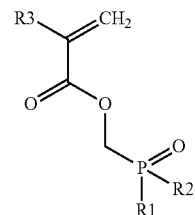
(2)

(In the formula, R1 and R2 represent any of one of an alkyl group, an alkoxy group, an aryl group and an aryloxy group, and they may be different or the same, and R3 in the formula is a methyl group or a hydrogen atom.)

As described above, the resin composition described here is used for producing an intermediate product such as a resin sheet and for producing a final product (resin cured product) such as a resin substrate. As will be described later, this "intermediate product" means a substance in which the curing reaction (crosslinking reaction) of the resin composition has not been substantially completed. Further, the "final product" means a substance in a state in which the curing reaction of the resin composition is substantially completed, as described later, and has a structure in which the thermosetting resin containing mesogen and the polymer-type flame retardant combined.

[Polymer Flame Retardant]

Since the polymer-type flame retardant does not react with the thermosetting resin, it does not disturb the repeating unit formed by the reaction of the thermosetting resin. Therefore, the orientation structure of the polymer chain is not easily broken, and high thermal conductivity derived from the orientation structure can be realized.

In order to realize the flame retardancy of UL94 V-0 (international standard for combustibility of plastic materials) using phosphorus, the content of phosphorus atoms in the total resin weight can be set to 1 wt % to 3 wt %. If it is less than 1 wt %, the flame-retardant effect does not appear, and if it exceeds 3 wt %, the phosphorus content becomes excessive with respect to the flame-retardant effect. Further, although the polymer-type flame retardant does not easily destroy the orientation structure, if the amount of the polymer-type flame retardant added to the resin composition is too large, the thermal conductivity of the cured resin may be lowered. Therefore, the higher the phosphorus atom content in the polymer flame retardant, the more preferable, specifically, 10 wt % or more, more preferably 15 wt % or more, and most preferably 20 wt % or more.

Since polymer-type flame retardants do not form covalent bonds with polymer chains, bleed-out occurs when the molecular weight becomes too small. Therefore, the degree of polymerization of the polymer-type flame retardant is preferably 5 or more, more preferably 10 or more, and most preferably 20 or more. Further, if the degree of polymerization of the polymer type flame retardant is too large, the solubility in a solvent is lowered, so that it is preferably 10,000 or less.

R1 and R2 in the formulae (1) and (2) include a structure selected from the group consisting of an alkyl group, an alkoxy group, an aryl group and an aryloxy group. The types of the alkyl group, the alkoxy group, the aryl group and the aryloxy group are not particularly limited, and typical substituents thereof include the following. Alkyl groups include methyl, ethyl, n-propyl, isopropyl and the like. Alkoxy groups include methoxy, ethoxy, n-propoxy, isopropoxy and the like. The structures of the aryl group and the aryloxy group can also be represented by the following formulae (3-1) to (3-6).

[Formula 3]

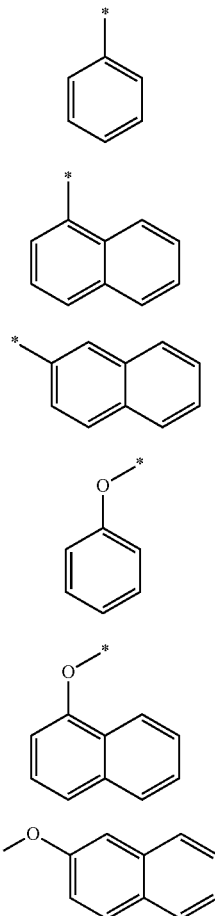

The polymer-type flame retardant may take any form of homopolymer, random copolymer, or block copolymer. By performing the copolymerization, the solubility of the polymer-type flame retardant in the solvent and the compatibility with the thermosetting resin are improved. Further, styrene or MMA containing no phosphorus atom can be used as the copolymerization component of the polymer-type flame retardant. The combination to be copolymerized is not particularly limited, but can also be expressed by the following formulae (4-1) to (4-3).

[Formula 4]

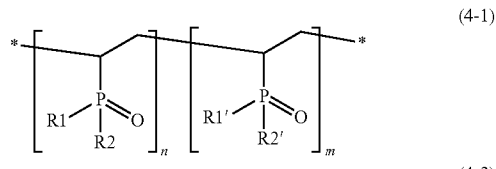

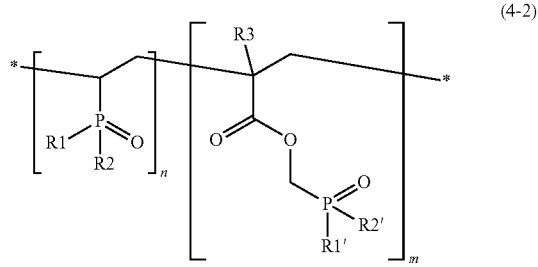

(R1, R2, R1', R2' in the formula indicate any of an alkyl group, an alkoxy group, an aryl group and an aryloxy group, and they may be different or the same, and R3 in the formula is a methyl group or a hydrogen atom. n and m in the equation are integers greater than or equal to 0 and are arbitrary numbers such that n+m>0.)

The method of polymerizing the monomer as a raw material of the polymer-type flame retardant is not particularly limited, and the initiator, catalyst, solvent, reaction conditions and the like can be appropriately selected. As the initiator and catalyst, a metal complex such as a radical polymerization initiator, an anionic polymerization initiator, a cationic polymerization initiator, and metallocenes can be used. The solvent is not particularly limited as long as it is a solvent capable of dissolving a monomer such as THF and toluene, and if the monomer is a liquid, it may be a solvent-free solvent. It is also possible to synthesize the polymer not only in a homogeneous solution but also in a heterogeneous system such as emulsion polymerization.

[Thermosetting Resin]

The "mesogen" in the present embodiment means a "rod-shaped or plate-shaped functional site containing two or more ring structures" necessary for exhibiting liquidity, and a polycyclic aromatic component such as naphthalene and anthracene. It is a general term for atomic groups that include the skeleton of group hydrocarbons and have rigidity and orientation.

Two or more aromatic rings or non-aromatic rings are bonded by a single bond or a non-single bond, and an example of a skeleton bonded by a single bond is biphenyl or terphenyl. Further, the type of bond may be only a single bond, only a non-single bond, or a mixture of a single bond and a non-single bond.

Further, the type of non-single bond is not limited to one type.

"Non-single bond" is a general term for divalent groups containing one or more constituent elements and one or more multiple bonds. Specifically, the non-single bond contains any one or more of the constituent elements such as carbon (C), nitrogen (N), oxygen (O) and hydrogen (H). In addition, the non-single bond includes one or both of a double bond and a triple bond as a multiple bond.

Specific examples of non-single bonds include bonds represented by the following formulae (5-1) to (5-10). The arrows shown in each of the formulae (5-6) and (5-10) represent coordination bonds.

[Formula 5]

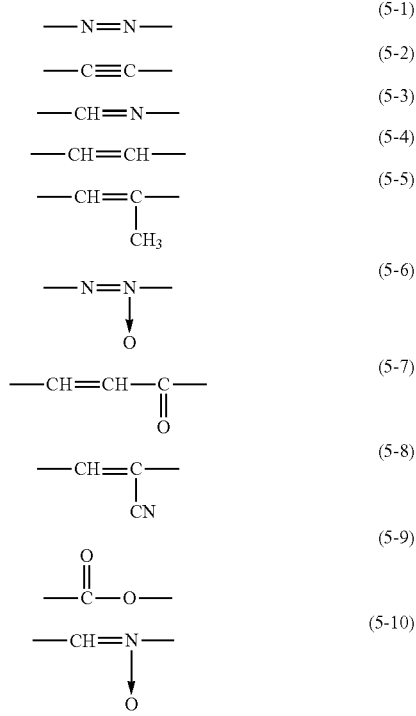

These mesogens may have a substituent such as an alkyl group, an alkoxy group, or a cyano group, but from the viewpoint of orientation, it is preferable that they do not contain a substituent. Further, as the mesogen, a biphenyl skeleton is preferable because of its high intermolecular stacking property.

The thermosetting resin has one or more polymerization modes selected from the group of epoxy resin, polyurethane, polyimide, unsaturated polyester resin, diallyl phthalate resin, silicon resin, and vinyl ester resin. Although not particularly limited, it is preferable to include an epoxy resin for ease of handling.

When the polymer chain is oriented when the thermosetting resin containing mesogen is cured, a peak is observed in the range of $2\theta \leq 30°$ in the measurement of the X-ray diffraction spectrum. If no peak is observed in this range, the thermal conductivity tends to be low even if mesogen is contained because the orientation of the polymer chain has not occurred.

[Other Materials]

This resin composition may contain any one or more of the other materials together with the polymer-type flame retardant and the thermosetting resin component described above.

The types of other materials are not particularly limited, but are, for example, additives, solvents, flame retardants, thermally conductive fillers, and the like.

Additives include, for example, curing catalysts, plasticizers and coupling agents. The curing catalyst depends on the polymerization mode selected, but is based on basic substances such as imidazoles and tertiary amines, radical generators such as peroxides and azo compounds and triethylborane, and ions such as Bronsted acids, Lewis acids and carbocations. Such as a polymerization initiator. The plasticizer is a molecular compound having only one reactive group capable of reacting with the selected thermosetting resin. Specific examples of the coupling agent include a silane coupling agent and a titanate coupling agent.

The solvent is used to disperse or dissolve the polymer-type flame retardant and the thermosetting resin component. This solvent is any one or more of organic solvents and the like, and specific examples of the organic solvent include methyl ethyl ketone, methyl cellosolve, methyl isobutyl ketone, dimethylformamide, propylene glycol monomethyl ether, toluene, xylene, and the like. Acetone, 1,3-dioxolane, N-methylpyrrolidone and γ-butyrolactone and the like.

The other resin component is not particularly limited, but may include a thermoplastic resin, a thermosetting resin component containing no mesogen, and the like.

From the viewpoint of effect, it is preferable that more than half of the resin composition is a thermosetting resin component containing mesogen.

The thermally conductive filler is any one or more of the particulate inorganic materials. Specific examples of this heat conductive filler include magnesium oxide (MgO), aluminum oxide ($Al_2O_3$), silicon oxide ($SiO_2$), aluminum hydroxide ($Al(OH)_3$), boron nitride (BN), aluminum nitride (AlN), silicon nitride ($Si_3N_4$) and the like. Among them, the higher the thermal conductivity of the thermally conductive filler, the more advantageous it is to improve the thermal conductivity of the composite. Therefore, it is desirable that the thermal conductivity of the thermally conductive filler is 30 W/(m·K) or more. Specific examples include magnesium oxide, aluminum oxide, boron nitride, silicon carbide, silicon nitride and the like. Among the above, magnesium oxide and boron nitride are preferable as the heat conductive filler to be added because they are excellent in chemical stability and workability.

(1-2. Producing Method)

This resin composition is produced, for example, by the following procedure.

The polymer type flame retardant and the thermosetting resin component containing mesogen are mixed. When the material used for the resin composition is in a block form, it may be pulverized before mixing. As a result, a resin composition containing a polymer-type flame retardant and a thermosetting resin component containing mesogen can be obtained.

A solvent may be added to the resin composition thus obtained to be used. In this case, after adding the solvent to the thermosetting resin component containing the polymer-type flame retardant and mesogen, the solvent is stirred using a stirring device such as a mixer. As a result, each component is dispersed or dissolved in the solvent.

Further, the resin composition may be heated and melted to be used. In addition, if necessary, a melt of the resin composition may be molded using a mold or the like, and the melt may be cooled to be used.

(1-3. Actions and Effects)

According to this resin composition, a polymer-type flame retardant as shown in the formula (1) and a thermosetting resin component containing mesogen are contained. In this case, a cured resin product having excellent thermal conductivity and flame retardancy can be obtained as described above.

(2. Resin Sheet)

Next, the resin sheet of one embodiment of the present invention will be described. Hereinafter, the resin composition already described is referred to as "the resin composition of the present invention."

The resin sheet contains the resin composition of the present invention. The structure of this resin sheet is not particularly limited as long as it contains the resin composition of the present invention. That is, the resin sheet may not include other components together with the resin composition, or may include other components together with the resin composition.

(2-1. Configuration)

FIG. 1 shows the cross-sectional structure of the resin sheet 10. The resin sheet 10 is a resin composition (resin composition layer 1) molded into a sheet shape, and more specifically, it is a single layer body composed of one resin composition layer 1. The thickness of the resin sheet 10 is not particularly limited. The structure of the resin composition layer 1 is the same as that of the resin composition of the present invention, except that it is formed into a sheet.

Figure 2:
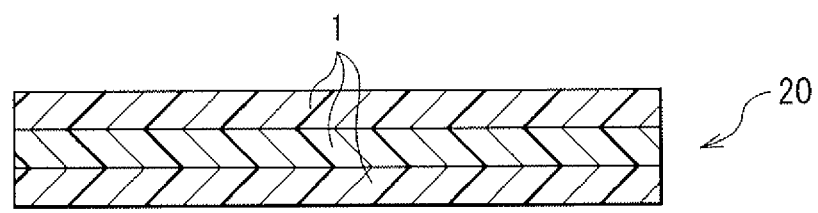
FIG. 2 is a cross-sectional view showing another configuration of a resin sheet using the resin composition of the embodiment of the present invention.

FIG. 2 shows the cross-sectional structure of the resin sheet 20. The resin sheet 20 is a laminated body in which a plurality of resin composition layers 1 are laminated. In the resin sheet 20, the number of layers of the resin composition layer 1 (number of layers) is not particularly limited as long as it is two or more layers. FIG. 2 shows, for example, a case where the number of laminated resin composition layers 1 is three. In the resin sheet 20, the configuration of each resin composition layer 1 is not particularly limited. That is, the composition of the resin composition in each resin composition layer 1 may be the same or different. Of course, among the plurality of resin composition layers 1, the composition of the resin composition in some of the resin composition layers 1 may be the same.

Figure 3:
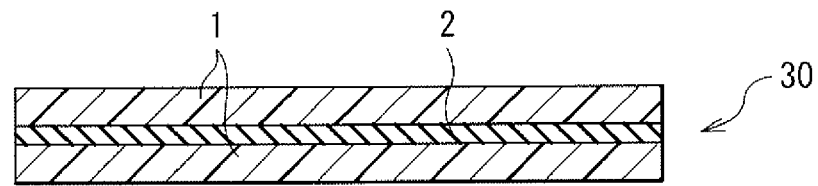
FIG. 3 is a cross-sectional view showing still another configuration of a resin sheet using the resin composition of the embodiment of the present invention.

FIG. 3 shows the cross-sectional structure of the resin sheet 30. The resin sheet 30 includes a core material 2 together with a resin composition (resin composition layer 1) molded into a sheet shape. For example, it has a three-layer structure in which the core material 2 is sandwiched between two resin composition layers 1.

The core material 2 contains, for example, any one or more of fibrous substances and non-fibrous substances, and is formed into a sheet shape. The fibrous material is, for example, glass fiber, carbon fiber, metal fiber, natural fiber, synthetic fiber, and the like. The fibrous material formed into a sheet is, for example, woven fabric and non-woven fabric. Specific examples of synthetic fibers include polyester fibers and polyamide fibers. The non-fibrous substance is, for example, a polymer compound. The non-fibrous substance formed into a sheet is, for example, a polymer film. Specific examples of the polymer compound are polyethylene terephthalate (PET) and the like.

The resin composition layer 1 used in the resin sheet 30 may be only one layer or two or more layers. The fact that one layer or two or more layers may be used is the same for the core material 2.

Further, the resin sheet 30 is not limited to a three-layer structure in which the core material 2 is sandwiched between the two resin composition layers 1, but also may have a two-layer structure in which the resin composition layer 1 and the core material 2 are laminated. In addition, two or more resin sheets 30 may be laminated.

(2-2. Producing Method)

When producing the resin sheet 10, for example, the same procedure as the method for producing the resin composition of the present invention is used.

Specifically, the resin composition is molded into a sheet shape to form the resin composition layer 1. In this case, a melt of the resin composition may be molded. When molding a melt, first, the resin composition is heated to melt the resin composition. Subsequently, after molding the melt of the resin composition, the molded product is cooled.

When a resin composition to which a solvent is added is used, the resin composition is applied to the surface of a support such as a polymer film, and then the solvent is volatilized. As a result, the resin composition is formed into a sheet on the surface of the support. That is, the resin composition is filmed on the surface of the support. Therefore, the resin composition layer 1 is formed. After that, the resin composition layer 1 is peeled off from the support.

When the resin sheet 20 is produced, the above-mentioned procedure for forming the resin composition layer 1 is repeated, and a plurality of resin composition layers 1 are laminated. In this case, after forming a laminated body in which a plurality of resin composition layers 1 are laminated, the laminated body may be pressurized while heating as necessary. As a result, the resin composition layers 1 are brought into close contact with each other.

In the case of producing the resin sheet 30 having a three-layer structure, for example, a resin composition to which a solvent is added is applied to both surfaces of the core material 2, and then the solvent is volatilized. As a result, the two resin composition layers 1 are formed so as to sandwich the core material 2. In this coating step, when the core material 2 contains a fibrous substance, the surface of the core material 2 is covered with the resin composition, and a part of the resin composition is impregnated inside the core material 2. Alternatively, when the core material 2 contains a non-fibrous substance, the surface of the core material 2 is covered with the liquid resin composition.

Of course, in the case of producing the resin sheet 30 having a two-layer structure, the resin composition may be applied only to one side of the core material 2.

In the case of producing the resin sheet 30, for example, the resin composition may be heated to melt the resin composition, and then the core material 2 may be immersed in the melt. In this case, the core material 2 is taken out from the melt, and then the core material 2 is cooled. As a result, the resin composition layer 1 is formed on both surfaces of the core material 2.

Here, when a resin composition to which a solvent is added is used for producing the resin sheets 10 to 30, the liquid resin composition is filmed (solidified) in the solvent volatilization step as described above. However, the "film formation (solidification)" described here means that a substance in a fluid state changes to a self-sustaining state, and includes a so-called semi-cured state. That is, when the liquid resin composition is filmed, the curing reaction is not substantially completed, so that the resin composition is in a substantially uncured state. Therefore, it is preferable that the solvent volatilization condition when the resin composition to which the solvent is added is formed is a condition that does not substantially complete the curing reaction. Specifically, the drying temperature is preferably 50° C. to 100° C. and the drying time is preferably 1 minute to 120 minutes, and more preferably the drying temperature is 50° C. to 80° C., and the drying time is 3 minutes to 90 minutes.

The condition that the curing reaction is not substantially completed as described above is preferable even in the case where the melt of the solid resin composition is used for producing the resin sheets 10 to 30. That is, it is preferable that the heating conditions (heating temperature and heating time) when melting the resin composition are conditions that do not substantially complete the curing reaction.

(2-3. Actions and Effects)

Since this resin sheet contains the above-mentioned resin composition of the present invention, excellent thermal conductivity and flame retardancy can be obtained for the same reason as the resin composition. Other actions and effects are the same as those of the resin composition of the present invention.

(3. Resin Cured Product)

Next, the cured resin product according to the embodiment of the present invention will be described.

(3-1. Configuration)

Here, when the cured product of the thermosetting resin containing mesogen is oriented, a diffraction peak is observed in a region where 2θ is 30° or less when XRD measurement is performed using CuKα rays. Diffraction peaks appearing in the range of 10° to 30° are due to the arrangement between polymer chains, and peaks appearing in the region below 10° are due to the smectic phase structure formed by mesogen. The cured resin product having a diffraction peak in this region exhibits high thermal conductivity due to the ordering of the polymer chains.

(3-2. Producing Method)

When producing this cured resin product, there are methods such as heating the resin composition, irradiating it with light, and contacting it with water vapor. As a result, the resin composition causes a curing reaction, so that a cured resin product, which is a curing reaction product, can be obtained.

Curing conditions such as heating temperature and heating time, wavelength and intensity of irradiated light, and concentration of water vapor are not particularly limited. However, it is preferable they are conditions for substantially advancing the curing reaction unlike the above-mentioned method for producing a resin sheet.

(3-3. Actions and Effects)

Since this cured resin product contains the cured reaction product of the resin composition of the present invention described above, excellent thermal conductivity and flame retardancy can be obtained for the same reason as the resin composition. Other actions and effects are the same as those of the resin composition of the present invention.

(4. Resin Substrate)

Next, the resin substrate of one embodiment of the present invention will be described. Hereinafter, the resin sheet already described will be referred to as "the resin sheet of the present invention", and the cured resin product will be referred to as "the cured resin product of the present invention."

The resin substrate is one of the above-mentioned application examples of the cured resin product, and the resin substrate described here is, for example, a cured reaction product of the resin sheet of the present invention. The structure of this resin substrate is not particularly limited as long as it contains one or more curing reactants of the resin sheet.

(4-1. Configuration)

Figure 4:
FIG. 4 is a cross-sectional view showing the configuration of a resin substrate using the cured resin product of the embodiment of the present invention.

FIG. 4 shows the cross-sectional structure of the resin substrate 40. The resin substrate 40 is a curing reaction product of the resin sheet 10 shown in FIG. 1. That is, the resin substrate 40 is a curing reaction product (resin cured product layer 3) of the resin composition layer 1, and more specifically, it is a single layer body composed of one resin cured product layer 3.

Figure 5:
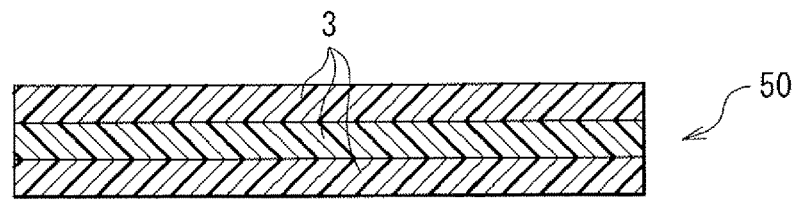
FIG. 5 is a cross-sectional view showing another configuration of a resin substrate using the cured resin product of the embodiment of the present invention.

FIG. 5 shows the cross-sectional structure of the resin substrate 50. The resin substrate 50 is a curing reaction product of the resin sheet 20 shown in FIG. 2. More specifically, it is a laminated body in which a curing reaction product (resin cured product layer 3) of a plurality of resin composition layers 1 is laminated. The number of layers of the cured resin layer 3 (number of layers) is not particularly limited as long as it is two or more layers. FIG. 5 shows, for example, a case where the number of layers of the cured resin layer 3 is three.

Figure 6:
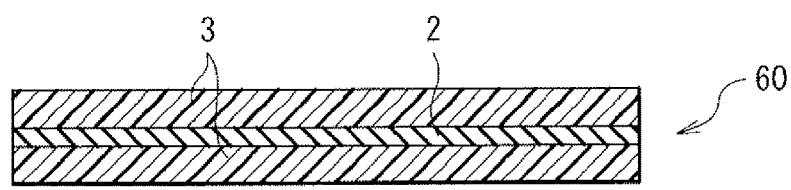
FIG. 6 is a cross-sectional view showing still another configuration of a resin substrate using the cured resin product of the embodiment of the present invention.

FIG. 6 shows the cross-sectional structure of the resin substrate 60. The resin substrate 60 is a cured reaction product of the resin sheet 30 shown in FIG. 3. More specifically, it has a three-layer structure in which one core material 2 is sandwiched between two cured resin layers 3.

Figure 7:
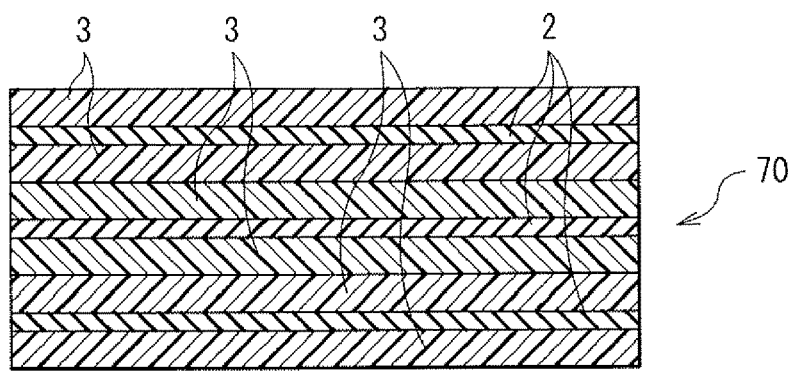
FIG. 7 is a cross-sectional view showing still another configuration of a resin substrate using the cured resin product of the embodiment of the present invention.

FIG. 7 shows the cross-sectional structure of the resin substrate 70. In this resin substrate 70, the curing reactants of two or more resin sheets 30 are laminated. Here, for example, the curing reactants of the three resin sheets 30 are laminated. That is, a three-layer structure in which one core material 2 is sandwiched between the two cured resin layers 3 is formed, and the three-layer structure is stacked in three stages.

The number of layers (number of stages) of the above-mentioned three-layer structure is not limited to three stages, and may be two stages or four or more stages. This number of stages can be appropriately set based on conditions such as the thickness and strength of the resin substrate 70.

Although not shown here, the resin substrate 70 may include a metal layer. This metal layer is provided, for example, on the surface of the uppermost resin cured product layer 3 and on the surface of the lowermost resin cured product layer 3.

The metal layer contains, for example, any one or more of copper, nickel, aluminum and the like. Further, the metal layer includes, for example, any one type or two or more types of a metal foil, a metal plate, and the like, and may be a single layer or a multi-layer. The thickness of the metal layer is not particularly limited, but is, for example, 3 μm to 150 μm. The resin substrate 70 provided with this metal layer is a so-called metal-clad substrate.

The metal layer may be provided only on the surface of the uppermost resin cured product layer 3, or may be provided only on the surface of the lowermost resin cured product layer 3.

If necessary, the resin substrate 70 provided with the metal layer may be subjected to any one or more of various treatments such as etching treatment and punching treatment. In this case, a multilayer substrate may be formed by stacking the resin substrate 70, the metal layer subjected to the above-mentioned various treatments, and any one or more of the resin sheets 10 to 30.

As described above, the fact that the metal layer may be provided or the multilayer substrate may be used is the same not only for the resin substrate 70 but also for the resin substrates 40 to 60 described above.

(4-2. Producing Method)

When the resin substrate 40 is produced, the resin sheet 10 is heated. As a result, as described above, the curing reaction of the resin composition in the resin composition layer 1 is substantially completed. Therefore, as shown in FIG. 4, the resin cured product layer 3, which is the curing reaction product of the resin composition layer 1, is formed.

When the resin substrate 50 is produced, the resin sheet 20 is heated. As a result, as described above, the curing reaction of the resin composition is substantially completed in each resin composition layer 1. Therefore, as shown in FIG. 5, the plurality of resin cured product layers 3, which are the curing reaction product of the plurality of resin composition layers 1, are formed.

When the resin substrate 60 is produced, the resin sheet 30 is heated. As a result, as described above, the curing reaction of the resin composition is substantially completed in each resin composition layer 1. Therefore, as shown in FIG. 6, the resin cured product layers 3, which are the curing reaction product of the plurality of resin composition layers 1, are formed on both sides of the core material 2.

Figure 8:
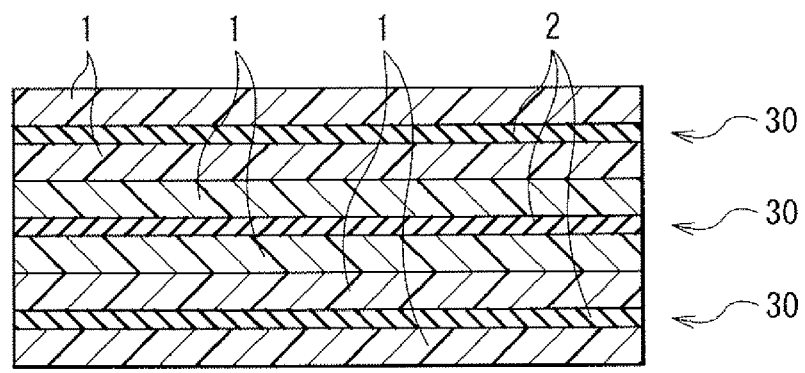
FIG. 8 is a cross-sectional view for explaining the method of manufacturing the resin substrate shown in FIG. 7.

FIG. 8 shows a cross-sectional configuration corresponding to FIG. 7 in order to explain a method of manufacturing the resin substrate 70. When manufacturing this resin substrate 70, first, as shown in FIG. 8, three resin sheets 30 are laminated. As a result, a laminated body of three resin sheets 30 is obtained. After that, the laminate is heated. As a result, in each resin sheet 30, the curing reaction of the resin composition is substantially completed in each resin composition layer 1. Therefore, as shown in FIG. 7, the resin cured product layers 3, which are the curing reaction product of the plurality of resin composition layers 1, are formed on both sides of each of the core materials 2.

Here, when the melt of the resin composition is used for producing the resin sheets 10 to 30, as described above, it is avoided that the curing reaction is substantially completed when the resin composition is melted. For this reason, it is preferable that the temperature at which the resin composition is heated to obtain the melt is lower than the temperature at which the curing reaction of the resin composition is substantially completed. In other words, the melting temperature of the resin composition is preferably lower than the temperature at which the curing reaction of the resin composition is substantially completed.

(4-3. Actions and Effects)

Since this resin substrate contains the cured resin product of the present invention, excellent thermal conductivity and flame retardancy can be obtained for the same reason as the cured resin product.

Other actions and effects are the same as those of the cured resin product of the present invention.

EXAMPLES

Examples of the present invention will be described in detail.

Examples 1 to 15, Comparative Examples 1 to 14

A resin composition was produced according to the procedure described below, and a cured resin composition was produced by heating the obtained resin composition.

First, the thermosetting resin component and the flame retardant were mixed. In this case, the amounts of the thermosetting resin component and the flame retardant were adjusted to prepare a resin composition so as to contain 2 wt % of phosphorus atoms with respect to the resin. The obtained resin composition was heated and stirred on a hot plate at 150° C. for about 20 minutes, and then heated in a dryer at 130° C. for 2 hours to be cured.

The types of epoxy resin and curing agent and the content (parts by mass) in the mixture are as shown in Table 1 (Example) and Table 2 (Comparative Example). As the thermosetting resin component, 1,7-octadiene epoxide (manufactured by Tokyo Chemical Industry Co., Ltd.), 4,4'-biphenol (manufactured by Tokyo Chemical Industry Co., Ltd.), compound 1, and hydroquinone (manufactured by Tokyo Chemical Industry Co., Ltd.) were used. As the flame retardants, polymer-type flame retardants 1 to 5 (manufactured by Katayama Chemical Industry Co., Ltd.), HCA-HQ-HS (Sanko Co., Ltd.), TX-1320A-EK70 (Nippon Steel & Sumikin Chemical Co., Ltd.), Triphenylphosphine oxide (Tokyo Chemical Industry Co., Ltd.) (Manufactured by Kogyo Co., Ltd.) were used. Moreover, aluminum oxide (CB-P10; manufactured by Showa Denko KK) was used as the heat conductive filler. N, N-dimethyl-m-anisidine (manufactured by Tokyo Chemical Industry Co., Ltd.) was used as the curing catalyst, and the amount added was 0.1 wt % with respect to the total epoxy groups contained in the epoxy resin.

TABLE 1

| | | Example | | | | | | | | | | | | | | | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 |
| Thermo-setting resin | 1,7-octadiene epoxide | 36.9 | 39.5 | 34.9 | 37.5 | 36.3 | 38.6 | 34.7 | 36.6 | | | | | | 8.86 | | 9.56 | 11.6 |
| | Compound 1 YH-434L | | | | | | | | | 63.8 | 68.2 | 60.3 | 64.8 | 66.6 | | 15.3 | | |
| | 4,4'-Biphenol | 48.4 | 51.7 | 45.7 | 49.1 | 47.5 | 50.6 | 45.5 | 48.1 | | | | | | 11.6 | | 12.5 | 15.2 |
| | hydroquinone | | | | | | | | | 21.5 | 23.0 | 20.3 | 21.8 | 22.4 | | 5.16 | | |
| Flame retardant | Polymer type flame retardant 1 | 14.7 | | | | 10.8 | | | | 14.7 | | | | | 3.53 | 3.53 | 3.81 | 4.63 |
| | Polymer type flame retardant 2 | | 8.80 | | | | 7.2 | | | | 8.80 | | | | | | | |
| | Polymer type flame retardant 3 | | | 19.4 | | | | 13.2 | | | | 19.4 | | | | | | |
| | Polymer type flame retardant 4 | | | | 13.4 | | | | 10.2 | | | | 13.4 | | | | | |

TABLE 1-continued

| | | Example | | | | | | | | | | | | | | | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 |
| | Polymer type flame retardant 5 | | | | | | | | | | | | | 11.0 | | | | |
| | HCA-HQ-HS | | | | | 5.40 | 3.60 | 6.60 | 5.10 | | | | | | | | | |
| | TX-1320A-EK70 | | | | | | | | | | | | | | | | | |
| | Triphenylphosphine oxide | | | | | | | | | | | | | | | | | |
| Inorganic particles | Aluminum oxide | | | | | | | | | | | | | | 76.0 | 76.0 | | |
| | Magnesium oxide | | | | | | | | | | | | | | | | 74.1 | 52.8 |
| | Boron nitride | | | | | | | | | | | | | | | | | 15.7 |
| Thermal conductivity | | 0.47 | 0.46 | 0.48 | 0.48 | 0.46 | 0.45 | 0.46 | 0.46 | 0.47 | 0.49 | 0.51 | 0.50 | 0.48 | 3.0 | 3.2 | 3.5 | 4.1 |
| Flame retardance (UL94-V0) | Before bleed-out test | ○ | ○ | ○ | ○ | ○ | ○ | ○ | ○ | ○ | ○ | ○ | ○ | ○ | ○ | ○ | ○ | ○ |
| | After bleed-out test | ○ | ○ | ○ | ○ | ○ | ○ | ○ | ○ | ○ | ○ | ○ | ○ | ○ | ○ | ○ | ○ | ○ |

TABLE 2

| | | Comparative Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Thermosetting resin | 1,7-octadiene epoxide | 43.3 | | 34.3 | 26 | 35.5 | | | | | | 1.38 | |
| | Compound 1 | | 74.8 | | | | 59.2 | 44.9 | 61.3 | | | | 2.39 |
| | YH-434L | | | | | | | | | 56.1 | 52.1 | | |
| | 4,4'-Biphenol | 56.7 | | 44.9 | 34 | 46.5 | | | | | | 1.82 | |
| | hydroquinone | | 25.2 | | | | 20.0 | 15.1 | 20.7 | 29.2 | 27.1 | | 0.81 |
| Flame retardant | Polymer type flame retardant 1 | | | | | | | | | 14.7 | | | |
| | Polymer type flame retardant 2 | | | | | | | | | | | | |
| | Polymer type flame retardant 3 | | | | | | | | | | | | |
| | Polymer type flame retardant 4 | | | | | | | | | | | | |
| | Polymer type flame retardant 5 | | | | | | | | | | | | |
| | HCA-HQ-HS | | | 20.8 | | | 20.8 | | | | 20.8 | 20.8 | 20.8 |
| | TX-1320A-EK70 | | | | 40.0 | | | 40.0 | | | | | |
| | Triphenylphosphine oxide | | | | | 18.0 | | | 18.0 | | | | |
| Inorganic particles | Aluminum oxide | | | | | | | | | | | 76.0 | 76.0 |
| | Magnesium oxide | | | | | | | | | | | | |
| | Boron nitride | | | | | | | | | | | | |
| Thermal conductivity | | 0.50 | 0.53 | 0.34 | 0.29 | 0.45 | 0.36 | 0.27 | 0.47 | 0.24 | 0.25 | 2.2 | 2.3 |
| Flame retardance (UL94-V0) | Before bleed-out test | x | x | ○ | ○ | ○ | ○ | ○ | ○ | ○ | ○ | ○ | ○ |
| | After bleed-out test | — | — | ○ | ○ | x | ○ | ○ | x | ○ | ○ | ○ | ○ |

LC-MS was measured using 1260 Infinity and 6120 Quadrupole LC/MS from Agilent Technologies.

The compound 1 represented by the following formula (6) was synthesized according to a conventional method. 4,4'-Biphenol (25.0 g, 0.134 mol) was dissolved in acetone (1 L) to dissolve 1-bromo-3-butene (52.3 g, 0.402 mol) and potassium hydroxide (22.5 g, 0.402 mol) was added and dissolved for 14 hours. The solvent was removed from the reaction mixture, and the obtained solid was washed with methanol to obtain 34.3 g of the target olefin according to the following formula (7).

The obtained olefin (34.3 g, 0.117 mol) was dissolved in dichloromethane (1 L) and cooled to 0° C. Then, MCPBA (containing about 30% water, 86.6 g) was added thereto, and the temperature was raised to room temperature with stirring. After that, stirring was continued for 6 hours. The obtained reaction mixture was diluted with methanol and the dichloromethane component was distilled off. The resulting precipitate was collected by filtration and washed repeatedly with methanol. The compound 1 represented by the following formula (6) was obtained as a white powder in yield and yield LC/MS (APCI): 325: 1.00, 326: 0.22, 327: 0.03 (—H +), Culc. MASS: 326.

[Formula 6]

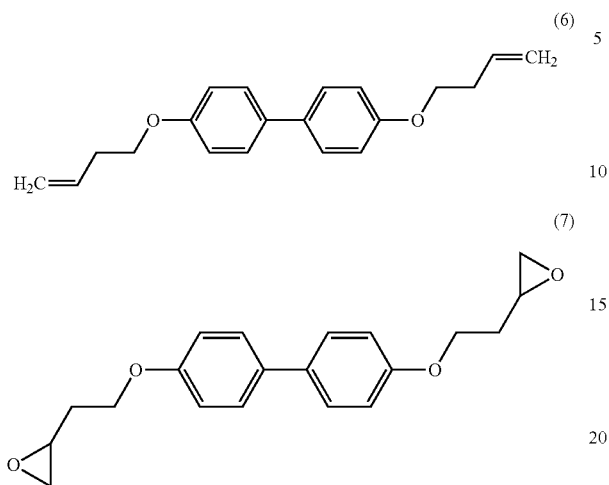

The structures of the polymer type flame retardants 1 to 5 are as shown in the following formulae (8) to (12), respectively. The number average molecular weight Mn and the weight average molecular weight Mw were calculated from the measurement results using TSKgel SuperAW2500 (6*150) for the GPC column, DMF for the eluent, and RI for the detector.

Polymer type flame retardant 1: The following formula (8)

(Mn=8967, Mw=10355, Mw/Mn=1.155)

Polymer type flame retardant 2: The following formula (9)

(Mn=9016, Mw=10563, Mw/Mn=1.172)

Polymer type flame retardant 3: The following formula (10)

(Mn=26229, Mw=34245, Mw/Mn=1.306)

Polymer type flame retardant 4: The following formula (11)

(Mn=25376, Mw=33988, Mw/Mn=1.339)

Polymer type flame retardant 5: The following formula (12)

(The ratio of n to m in the formula is 1:1. Mn=8992, Mw=10423, Mw/Mn=1.159)

[Formula 7]

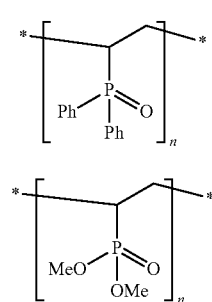

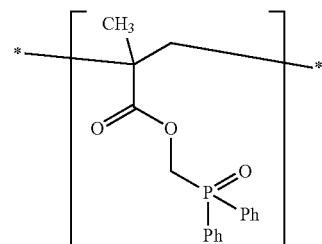

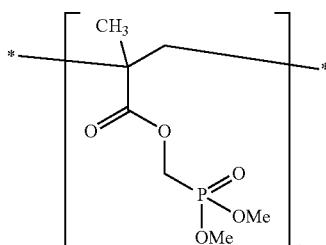

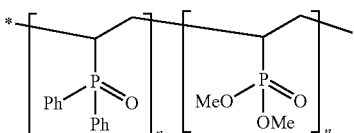

The thermal conductivity of the cured product was calculated by multiplying the thermal diffusivity, the specific heat and the density. A xenon flash method thermal diffusivity measuring device TD-1 HTV (manufactured by Advance Riko Co., Ltd.) was used for measuring the thermal diffusivity. The specific heat (25° C.) was determined using MDSC Q2000 (manufactured by TA Instrumental). The density was determined by the Archimedes method.

Flame retardant tests were performed according to ASTM D3801. In the bleed-out test, the sample for the flammability test was allowed to stand in a constant temperature bath at 125° C. for 24 hours, and then the surface was washed with acetone, which was repeated three times, and then subjected to the flammability test. The measurement results are shown in Table 1 (Example) and Table 2 (Comparative Example).

Samples that meet the UL94-V0 criteria are indicated by "○" (circles), and samples that do not meet the criteria are indicated by "x" (x).

The thermal conductivity of Examples 1 to 4 and 9 to 13 using the polymer-type flame retardant was reduced by 10% or less as compared with the case where the flame retardant was not added (Comparative Examples 1 and 2). On the other hand, in the case where the conventional flame retardant is added, the reduction rate was reduced by 20% or more in Comparative Examples 3, 4, 6 and 7 as compared with the case where the flame retardant was not added (Comparative Examples 1 and 2). In addition, in Comparative Examples 5 and 8, the flame retardancy after the bleed-out test was below the standard.

Even when the polymer-type flame retardant and HCA-HQ-HS were mixed at a weight ratio of 2:1, the reduction rate of the thermal conductivity was 10% or less (Examples 5 to 8).

When a thermosetting resin component containing no mesogen was used, there was no significant difference in thermal conductivity between the polymer-type flame retardant and the conventional flame retardant (Comparative Examples 9 and 10).

The thermal conductivity when 50 vol % of aluminum oxide was added as the thermally conductive filler was 3 W/m·K or more when the polymer type flame retardant was used (Examples 14 and 15). On the other hand, when the conventional flame retardant was used, it was 2.2 W/m·K or less (Comparative Examples 12 and 13). Since a polymer-type flame retardant was used to suppress a decrease in the thermal conductivity of the resin, a higher thermal conductivity was obtained as a composite.

From the results shown in Tables 1 and 2, a cured resin product having high thermal conductivity was obtained by using a polymer-type flame retardant and a thermosetting resin containing mesogen in combination.

Example 16

For the resin substrate 50 shown in FIG. 5, a resin composition was prepared under the same conditions as in Example 2, a solvent (methyl ethyl ketone) was added, and the solvent was stirred. As a result, the epoxy resin and the curing agent were dissolved in the solvent, so that a liquid resin composition was obtained. In this case, the concentration of the solid content (hardener) was set to 65% by mass.

Subsequently, a liquid resin composition was applied to the surface of the support (PET film, thickness=0.05 mm), and then the liquid resin composition was dried (temperature=80° C.). As a result, the resin composition layer 1 was formed on the surface of the support, so that the resin sheet 10 (thickness=0.1 mm) which was the single layer shown in FIG. 1 was obtained. After that, the resin sheet 10 was peeled off from the support.

Subsequently, 10 resin sheets 10 were stacked to prepare a resin sheet 20 (the number of layers of the resin composition layer 1=10 layers), which is the laminate shown in FIG. Finally, the laminate is heated (temperature=110° C.) and pressurized (pressure=1 MPa, time=20 minutes) using a flat plate press, and then the laminate was further heated (temperature=130° C.) and pressurized (pressure=4 MPa, time=1 hour). In this heating step, since the reaction of the resin composition was substantially completed in each resin composition layer 1, the resin cured product layer 3 containing the cured reaction product of the resin composition was formed. As a result, formation of the resin substrate 50 (the number of layers of the cured resin layer 3=10 layers, the thickness=0.9 mm) was completed.

The produced resin substrate had a thermal conductivity of 0.49 W/m·K, and a resin substrate having a high thermal conductivity was obtained.

Example 17

After preparing the resin composition under the same conditions as in Example 12, a resin substrate was prepared in the same manner as in Example 13. However, the concentration of the solid content (hardener, heat conductive filler) at this time was 80% by mass.

The produced aluminum oxide-containing resin substrate had a thermal conductivity of 2.89 W/m·K, and a resin substrate having a high thermal conductivity was obtained.

XRD measurement was performed using a general XRD apparatus (Empyrean, manufactured by PANalytical). The measurement conditions were as follows.
Source: CuKα ray
Scan conditions: 0.026°/step
Incident solar slit: 0.04 rad
Mask width: 10 mm
Light receiving solar slit: 0.04 rad Measurement time: 197 seconds/step
Measurement range: 2θ=4° to 40°

Figure 9:
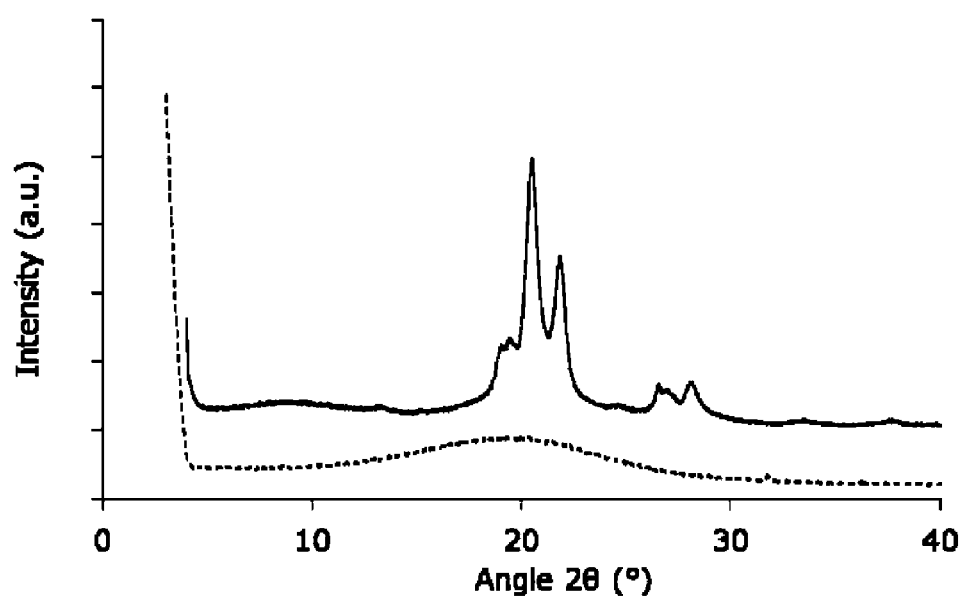
FIG. 9 is an XRD spectrum of Example 9 and Comparative Example 13.

The measured XRD spectrum of Example 9 is shown in FIG. 9 (shown by a solid line). A clear diffraction peak was observed in the region of 2θ≤30°.

Comparative Example 13

A cured resin prepared by curing a resin having the same composition as in Example 9 at 250° C. for 5 minutes was XRD-measured under the same conditions as in Example 9. The measured XRD spectrum is shown in FIG. 9 (shown by a broken line). Unlike the case of Example 9, only the halo pattern derived from amorphous was observed, and the diffraction peak disappeared. The thermal conductivity of this resin was 0.33 W/(m·K), which was significantly lower than that of Example 9.

Although the present invention has been described above with reference to embodiments and examples, the present invention is not limited to the embodiments described in the embodiments and examples, and various modifications are possible.

INDUSTRIAL AVAILABILITY

It is possible to provide a resin sheet, a resin substrate and the like satisfying both a high thermal conductivity and a high flame retardancy.

REFERENCE SIGNS LIST

1: Resin composition layer
2: Core material
3: Resin cured product layer
10, 20, 30: Resin sheet
40, 50, 60, 70: Resin substrate

The invention claimed is:
1. A resin composition comprising:
a thermosetting resin component including a mesogen;
a thermally conductive filler having a thermal conductivity of 30 W/(m·K) or more; and
a phosphorus atom-containing polymer compound formed by polymerizing or copolymerizing only monomers represented by general formula (2), or only monomers represented by general formulae (1) and (2) below,

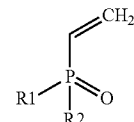 (1)

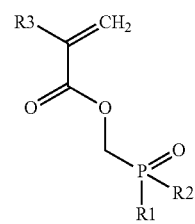 (2)

wherein, in the general formulae (1) and (2), each of R1 and R2 is any one of an alkyl group, an alkoxy group, an aryl group and an aryloxy group, R1 and R2 being different or identical, and R3 is a methyl group or a hydrogen atom.

2. The resin composition according to claim 1, wherein the thermosetting resin component is an epoxy resin.

3. The resin composition according to claim 1, wherein the mesogen is a biphenyl group.

4. A resin cured product obtained by curing the resin composition according to claim 1.

5. The resin cured product according to claim 4, wherein a diffraction angle in XRD measurement using a CuKα ray has a peak in a range of $2\theta \leq 30°$.

6. A resin sheet comprising the resin composition according to claim 1.

7. A resin substrate obtained by molding and curing a single sheet or a plurality of laminated sheets of the resin sheet according to claim 6.

8. The resin composition according to claim 1, wherein the phosphorus atom-containing polymer compound is a copolymer expressed by any of the following formulae (4-2) to (4-3):

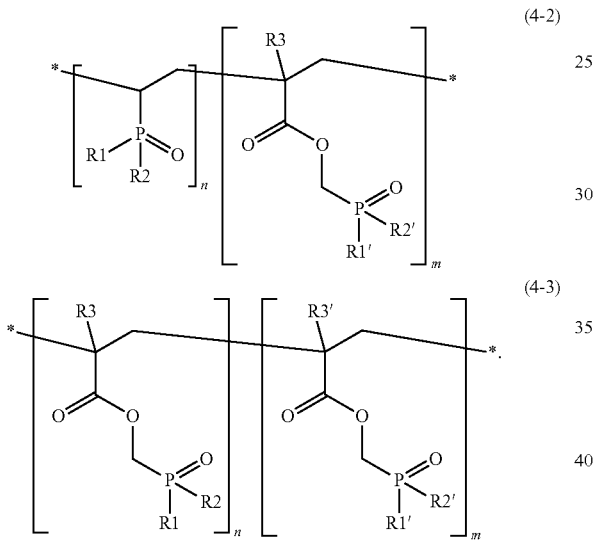

wherein R1, R2, R1', R2' indicate any of an alkyl group, an alkoxy group, an aryl group and an aryloxy group, and they may be different or the same, R3 and R3' is a methyl group or a hydrogen atom; n and m in the equation are integers greater than or equal to 0 and are arbitrary numbers such that n+m>0.

9. The resin composition according to claim 1, wherein the phosphorus atom-containing polymer compound is any one of the following formulae (10) to (11):

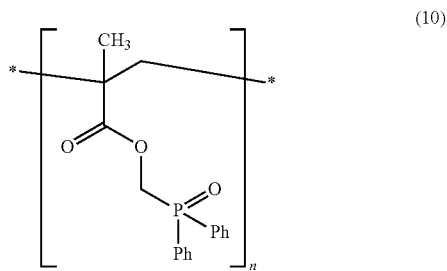

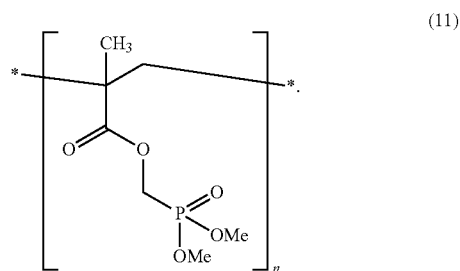

10. The resin composition according to claim 1, wherein monomers of general formula (1) are present, and in at least one monomer unit thereof, at least one of R1 and R2 is an aryl group or an aryloxy group.

* * * * *